(12) United States Patent
Hillan

(10) Patent No.: US 9,647,884 B2
(45) Date of Patent: May 9, 2017

(54) NEAR FIELD COMMUNICATION FORUM LISTEN MODE PROFILES

(71) Applicant: QUALCOMM Incorporated, San Diego, CA (US)

(72) Inventor: John Hillan, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/849,334

(22) Filed: Sep. 9, 2015

(65) Prior Publication Data

US 2016/0248627 A1 Aug. 25, 2016

Related U.S. Application Data (60) Provisional application No. 62/118,215, filed on Feb. 19, 2015.

(51) Int. Cl.
| | |
|---|---|
| H04L 12/24 | (2006.01) |
| H04L 29/08 | (2006.01) |
| H04W 4/00 | (2009.01) |
| H04B 5/00 | (2006.01) |

(52) U.S. Cl.
CPC ....... *H04L 41/0806* (2013.01); *H04B 5/0031* (2013.01); *H04L 67/104* (2013.01); *H04L 67/303* (2013.01); *H04W 4/008* (2013.01)

(58) Field of Classification Search
CPC ..... H04W 48/16; H04W 8/005; H04W 4/008; H04W 74/06; H04B 5/0056; H04B 5/0031; G06K 19/0725; H04L 41/0806; H04L 67/104; H04L 67/303
See application file for complete search history.

(56) References Cited

U.S. PATENT DOCUMENTS

| | | | |
|---|---|---|---|
| 8,060,012 B2 | 11/2011 | Sklovsky et al. | |
| 8,923,761 B2 | 12/2014 | Hillan | |
| 2010/0227553 A1* | 9/2010 | Charrat | G06Q 20/341 455/41.1 |

(Continued)

FOREIGN PATENT DOCUMENTS

| | | | | |
|---|---|---|---|---|
| CH | EP 2782400 A1 * | 9/2014 | ............ | H04W 8/005 |
| EP | 2680657 A1 | 1/2014 | | |
| WO | WO-2014/067547 A1 | 5/2014 | | |

OTHER PUBLICATIONS

International Search Report and Written Opinion—PCT/US2016/014435—ISA/EPO—Apr. 26, 2016. 12 Total Pages.

(Continued)

*Primary Examiner* — Devan Sandiford
(74) *Attorney, Agent, or Firm* — Arent Fox LLP (57) ABSTRACT

Systems, methods, and/or devices for enabling configuration of NFC devices acting in a listening operation mode are disclosed. In some examples, an NFC-enabled device may select a listening mode profile from a list of listening mode profiles that define parameters for configuring the NFC-enabled device. In some aspects, the list of listening mode profiles may include a set of configuration parameters and corresponding parameter values for peer-to-peer (P2P) listen mode profile, a Type 3 Tag (T3T) listen mode profile, a Type 4A Tag (T4AT) listen mode profile, and a Type 4B Tag (T4BT) listen mode profile.

38 Claims, 6 Drawing Sheets

(56) References Cited

U.S. PATENT DOCUMENTS

| | | | |
|---|---|---|---|
| 2012/0028579 A1* | 2/2012 | Fine | H04L 29/12254 455/41.1 |
| 2012/0135693 A1* | 5/2012 | Teruyama | H04W 4/20 455/68 |
| 2012/0137310 A1* | 5/2012 | Teruyama | H04W 4/00 719/320 |
| 2013/0281013 A1 | 10/2013 | Hillan | |
| 2015/0024683 A1 | 1/2015 | Hussain | |
| 2015/0126111 A1* | 5/2015 | Socol | G06K 19/0723 455/41.1 |

OTHER PUBLICATIONS

NFC Activity Specification 1.0, Nov. 18, 2010 (Nov. 18, 2010), XP055059248, Retrieved from the Internet: URL:http://www.nfc-forum.org/specs/spec_license/document_form/custom_layout?13654233 May 21, 2001 [retrieved on Apr. 11, 2013], p. 62-p. 66.

\* cited by examiner

NEAR FIELD COMMUNICATION FORUM LISTEN MODE PROFILES

CROSS-REFERENCE TO RELATED APPLICATION(S)

This application claims priority to U.S. Provisional Application Ser. No. 62/118,215, entitled, "NEAR FIELD COMMUNICATION FORUM LISTEN MODE PROFILES," and filed on Feb. 19, 2015, which is assigned to the assignee hereof and hereby expressly incorporated by reference herein in its entirety.

BACKGROUND

The disclosed aspects relate generally to near field communications, and more specifically, to configuring near field communication devices based on one or more listen mode profiles.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, near field communications (NFC), etc.

The NFC Forum ensures global interoperability between different NFC devices and defines a set of common features that must overlap across various vendors. In one example, the NFC Forum specification describes configuration parameters associated with a polling operation mode of a NFC device. However, neither the NFC Forum nor the conventional systems provide a method for configuring NFC devices operating in a listening operation mode. Thus, improvements in NFC device configuration may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

The described features of the present disclosure generally relate to one or more improved systems, methods, and/or devices for enabling configuration of NFC devices acting in a listening operation mode. For example, an NFC-enabled device, in accordance with the present disclosure may select a listening mode profile from a list of listening mode profiles that define parameters for configuring the NFC-enabled device. In some aspects, the list of listening mode profiles may include a set of configuration parameters and corresponding parameter values for peer-to-peer (P2P) listen mode profile, a Type 3 Tag (T3T) listen mode profile, a Type 4A Tag (T4AT) listen mode profile, or a Type 4B Tag (T4BT) listen mode profile.

According to an aspect of illustrative embodiments, a method for near field communication is described. The method may include determining to enter a listening operation mode. The method may further identify a listen mode profile from a plurality of listen mode profiles based on determining to enter the listening operation mode and configure a first NFC device based on the listen mode profile.

According to an aspect of illustrative embodiments, an apparatus for near field communication is described. The apparatus may comprise means for determining to enter a listening operation mode. The apparatus may further include means for identifying a listen mode profile from a plurality of listen mode profiles based on means for determining to enter the listening operation mode and means for configuring a first NFC device based on the listen mode profile.

According to an aspect of illustrative embodiments, a computer readable medium storing computer executable code for near field communication is disclosed. The computer readable medium may comprise code for determining to enter a listening operation mode. The computer readable medium may further include code for identifying a listen mode profile from a plurality of listen mode profiles based on code for determining to enter the listening operation mode and code for configuring a first NFC device based on the listen mode profile.

According to an aspect of illustrative embodiments, yet another apparatus for wireless communication is disclosed. The apparatus may include a memory configured to store a plurality of listen mode profiles and at least one processor communicatively coupled to the memory and the transceiver via a bus. In some examples, the at least one processor may be configured to determine to enter a listening operation mode. The apparatus may further identify a listen mode profile from a plurality of listen mode profiles based on determining to enter the listening operation mode and configure a first NFC device based on the listen mode profile.

To accomplish the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It should be understood, however, that such aspect(s) may be practiced without these specific details. In an aspect, the term "component" as used herein may be one of the parts that make up a system, may be hardware, firmware, and/or software, and may be divided into other components.

An NFC device may operate according to one or more NFC modes of operation. In some aspects, an NFC device may operate according to a polling operation mode or a listening operation mode. Identifying whether the NFC device is acting in accordance with the polling operation mode or the listening operation mode may dictate whether to configure the NFC device as, for example, a reader/writer or a card emulator. While acting as a reader/writer, the NFC device may emit an electromagnetic field that powers a passive transponder/tag. Accordingly, in some aspects, the NFC device acting as a reader/writer may read and alter data stored in an NFC compliant passive (e.g., without battery) transponder/tag. The tag may permit the retrieval of additional information by reading the tag with the NFC device acting as the reader/writer. Additionally or alternatively, an NFC device acting as a card emulator may perform functions similar to a smart card (e.g., ISO 14443). The emulated smart card may then be accessed by an external NFC reader, such as, but not limited to, an NFC point-of-sale terminal As discussed above, conventional systems provide one or more polling mode profiles that allow an NFC device to be easily configured based on polling mode configuration parameters. However, the conventional systems fail to provide similar configuration accessibility for NFC devices in a listening operation mode. For example, in a peer-to-peer (P2P) communication, where an initiator device may communicate with a target device, the current specification provides configuration parameters for setting up the P2P initiator device, while failing to support configuration parameters for setting up P2P target device. Therefore, aspects of the present disclosure provide a method for configuring the NFC devices in a listening operation mode based on one or more listen mode profiles that include a set of configuration parameters and corresponding parameter values. In some aspects, the one or more listen mode profiles may include, but are not limited to, a P2P listen mode profile, a Type 3 Tag (T3T) listen mode profile, a Type 4A Tag (T4AT) listen mode profile, or a Type 4B Tag (T4BT) listen mode profile.

Figure 1:
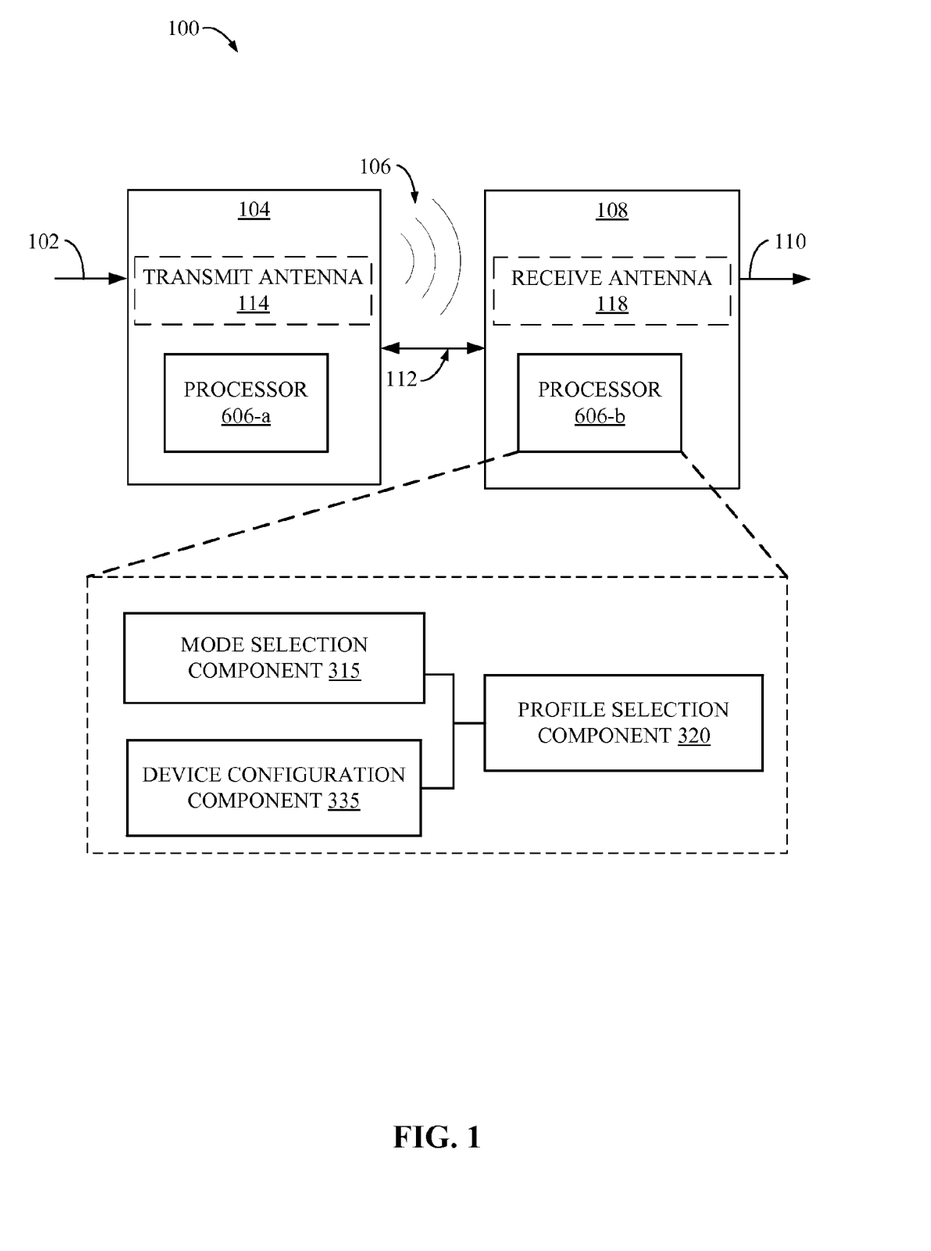
FIG. 1 is a block diagram of a wireless communication system in accordance with an aspect of the present disclosure.
Figure 3:
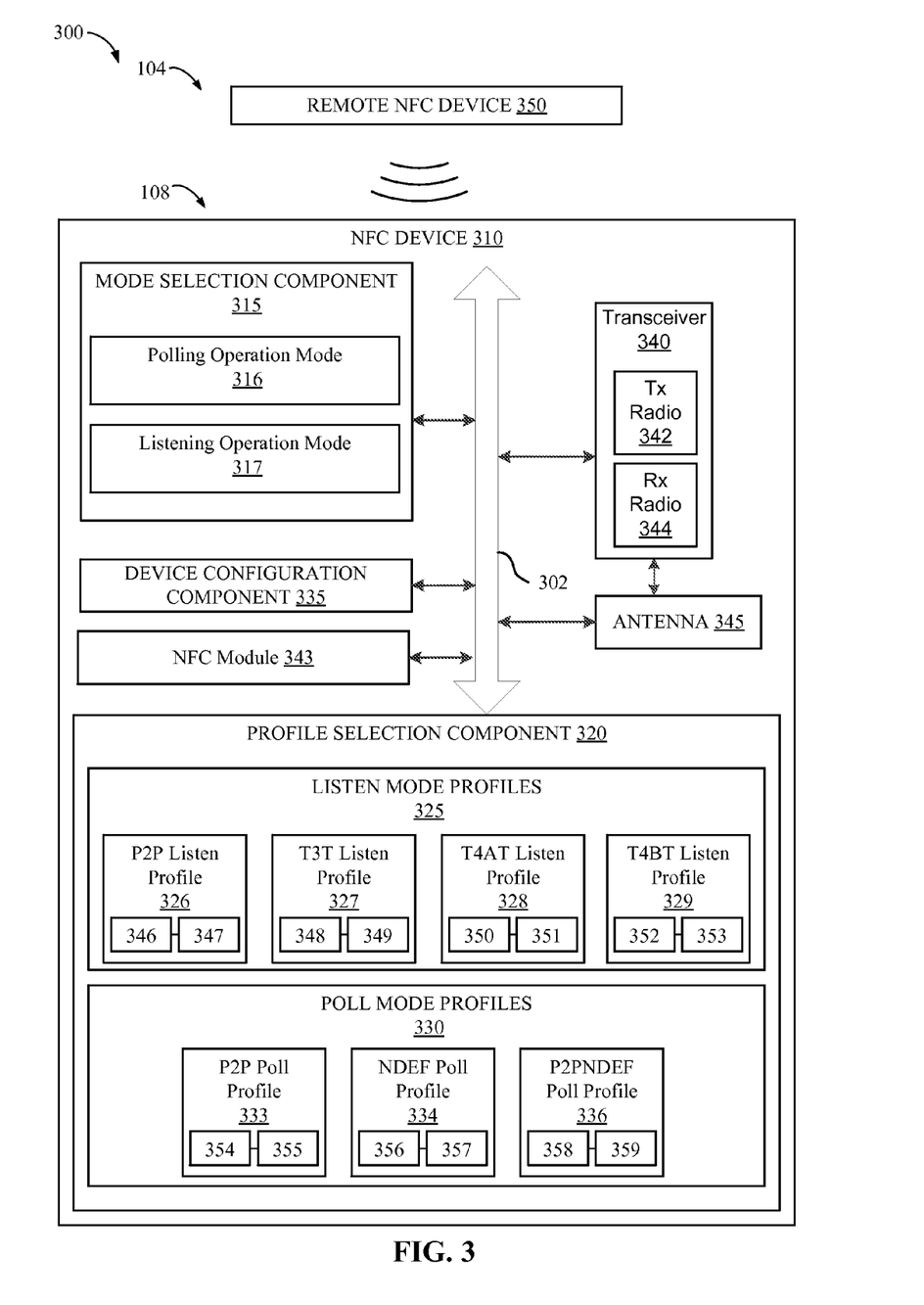
FIG. 3 is a block diagram of an NFC environment in accordance with an aspect of the present disclosure.

Referring to FIG. 1, a wireless communication system 100, in accordance with various aspects described herein includes a transmitter 104 and a receiver 108 capable of NFC communications, where receiver 108 may implement one or more aspects described herein for configuring a listening operation mode based on one or more listen mode profiles. In some examples, FIG. 1 illustrates a high-level implementation of the transmitter 104 and the receiver 108, which each may be a part of an NFC device. A detailed hardware schematic of the NFC device operating as a transmitter 104 and/or the receiver 108 (e.g., remote NFC device 350 and/or NFC device 310, respectively) is illustrated in FIG. 7. In some aspects, receiver 108 may be included as part of NFC device 310 (FIG. 3). Specifically, for example, transmitter 104 and/or receiver 108 may form or otherwise be part of transceiver 360 (FIG. 3). Additionally, transmit antenna may otherwise be part of antenna 345 (FIG. 3). Input power 102 is provided to a transmitter 104 for generating a radiated inductive field 106 for providing energy transfer. A receiver 108 couples to the radiated inductive field 106 and generates an output power 110 for storage or consumption by a device (not shown) coupled to the output power 110. Both the transmitter 104 and the receiver 108 are separated by a distance 112, which is also referred to herein as an operating volume (OV). In one example, transmitter 104 and receiver 108 are configured according to a mutual resonant relationship and when the resonant frequency of receiver 108 and the resonant frequency of transmitter 104 are within a threshold OV, transmission losses between the transmitter 104 and the receiver 108 are minimal (e.g., when the receiver 108 is located in the "near-field" of the radiated inductive field 106).

Transmitter 104 further includes a transmit antenna 114 for transmitting energy and signals. A receiver 108 includes a receive antenna 118 for receiving signal and energy if needed. The transmit antenna 114 and receive antenna 118 can be sized according to applications and devices associated therewith. As stated, an efficient energy transfer can occur by coupling a large portion of the energy in the near-field of the transmitting antenna 114 to a receiving antenna 118 rather than propagating most of the energy in an electromagnetic wave to a far field. When in this near-field, a coupling mode may be developed between the transmit antenna 114 and the receive antenna 118. The area around the antennas 114 and 118 where this near-field coupling may occur is referred to herein as a coupling-mode region.

In some configurations, where the transmitter 104 and receiver 108 are in very close proximity, matching networks (not shown) related to the antennas 114, 118 that process the signals may become detuned due to high mutual coupling in signals communicated between the transmitter 104 and receiver 108, and thus communications between transmitter 104 and receiver 108 may break down. This condition is referred to herein as over-coupling. In such examples, as described further herein, transmitter 104 can detect such over-coupling with receiver 108 or related receive antenna 118, and can attempt to mitigate the condition by modifying one or more transmit and/or receive parameters at transmitter 104.

As discussed above, an NFC device (e.g., transmitter 104 and/or receiver 108) may operate according to one or more NFC modes of operation. Specifically, an NFC device may operate according to a polling operation mode or a listening operation mode. Accordingly, in some aspects, the transmitter 104 may be configured to operate in a polling operating mode and the receiver 108 may operate in a listening operation mode. Each of the transmitter 104 and the receiver 108 may include a processor 606 (FIG. 6) for configuring the respective NFC device (e.g., transmitter 104 and/or receiver 108) to operate in the polling mode or listen mode. In some examples, the processor may include a mode selection component 315 (FIG. 3) that may select one of a polling operation mode or a listening operation mode based on characteristics of at least one or more applications running on the NFC device (e.g., transmitter 104 and/or the receiver 108). In an aspect, for example, mode selection component 315 may include hardware (e.g., one or more processor modules of the one or more processors 606-a, 606-b or 606

(see FIG. 6)) and/or software code or instructions stored on a computer-readable medium (e.g., memory 608, see FIG. 6) and executable by at least one of the one or more processors to perform the specially configured mode selection-related actions described herein. For example, but not limited hereto, if the one or more application is a mobile payment application for facilitating payments to vendors (e.g., coffee shops) via credit card information stored in the memory of the NFC device, the mode selection component 315 may select a listening operation mode for the NFC device. Alternatively, if the one or more application is a data sharing application where the user may select to share one or more data files (e.g., photos or contact information) on the NFC device with a remote NFC device, the mode selection component 315 may select a polling operation mode to facilitate the sharing.

Additionally or alternatively, the processor 606 may include a profile selection component 320 for identifying and selecting a profile from a plurality of poll mode/listen mode profiles available. In an aspect, for example, profile selection component 320 may include hardware (e.g., one or more processor modules of the one or more processors 606-a, 606-b or 606 (see FIG. 6)) and/or software code or instructions stored on a computer-readable medium (e.g., memory 608, see FIG. 6) and executable by at least one of the one or more processors to perform the specially configured mode selection-related actions described herein. In some examples, the transmitter 104 and/or receiver 108, upon selecting a mode of operation (e.g., via mode selection component 315), may identify a poll mode profile from a set of poll mode profiles or a listen mode profile from a set of listen mode profiles, respectively, to configure each device based on the mode selection. In accordance with aspects of the present disclosure, a set of listen mode profiles may include configuration parameter values for at least one listen state. The set of listen mode profiles may include, but are not limited to, a peer-to-peer (P2P) listen mode profile, a Type 3 Tag (T3T) listen mode profile, a Type 4A Tag (T4AT) listen mode profile, and a Type 4B Tag (T4BT) listen mode profile. The set of configuration parameters and corresponding parameter values for each of the listen mode profiles is disclosed with reference to FIG. 3.

In some aspects, the processor 606 may additionally include a device configuration component 335 (FIG. 3) for configuring the transmitter 104 and/or receiver 108 based on the profile selected by the profile selection component 320. In an aspect, for example, profile selection component 320 may include hardware (e.g., one or more processor modules of the one or more processors 606-a, 606-b or 606 (see FIG. 6)) and/or software code or instructions stored on a computer-readable medium (e.g., memory 608, see FIG. 6) and executable by at least one of the one or more processors to perform the specially configured mode selection-related actions described herein. Configuring the NFC device based on the selected profile may include modifying one or more configuration parameters and corresponding parameter values in the NFC device in order to facilitate the NFC device to function as an initiator or a target device. For example, when a peer-to-peer (P2P) communication is selected, an initiator device (e.g., transmitter 104) may be configured utilizing values provided by P2P poll mode profile, while the target device (e.g., receiver 108) may modify one or more configuration parameters based on the configuration values provided in P2P listen mode profile. In some examples of the present disclosure, the selection and execution of one of the set of listen mode profiles 325 may occur without user intervention during a communication establishment procedure.

Figure 2:
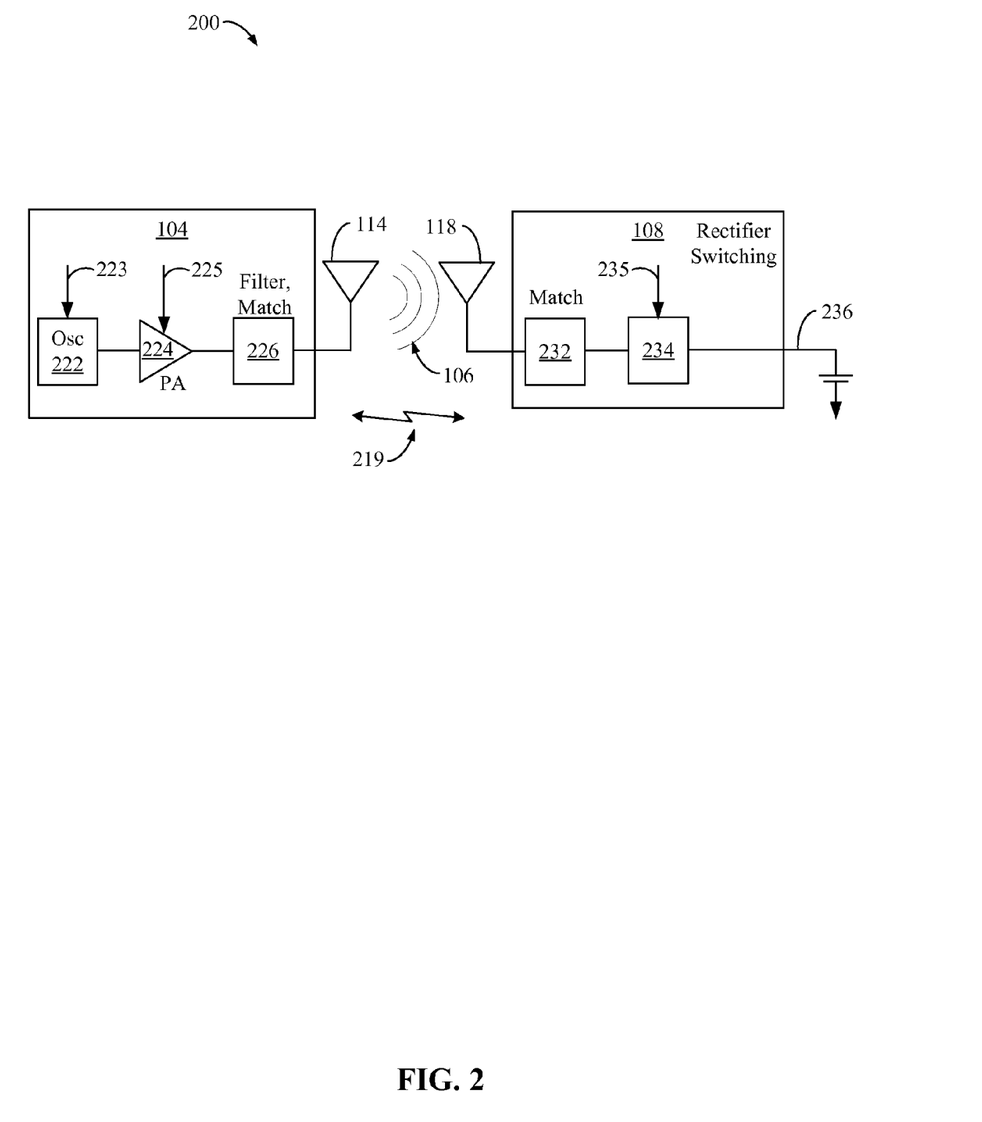
FIG. 2 is a schematic diagram of a wireless communication system in accordance with an aspect of the present disclosure.

Referring to FIG. 2, an example near field wireless communication system 200 includes transmitter 104 and receiver 108 capable of NFC communications, where receiver 108 may implement one or more aspects described herein for configuring a listening operation mode based on one or more listen mode profiles. The transmitter 104 includes an oscillator 222, a power amplifier 224 and a filter and matching circuit 226. In some aspects, transmitter 104 may be included as part of NFC device 310 (FIG. 3). Specifically, for example, transmitter 104 may form or otherwise be part of transceiver 360 (FIG. 3). Additionally, transmit antenna may form otherwise be part of antenna 345 (FIG. 3). The oscillator 222 is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 104 to the transmit antenna 114.

The receiver 108 may include a matching circuit 232 and a rectifier and switching circuit 234 to generate a DC power output to charge a battery 236 as shown in FIG. 2 or power a device coupled to the receiver (not shown), though it is to be appreciated that devices may each have batteries (e.g., in peer-to-peer communications) such that powering by magnetic field may not be needed. The matching circuit 232 may be included to match the impedance of the receiver 108 to the receive antenna 118. In some aspects, receiver 108 may be included as part of NFC device 310 (FIG. 3). The receiver 108 and transmitter 104 may communicate on a separate communication channel 219 (e.g., Bluetooth, WiFi, zigbee, cellular, etc), in one example.

Referring to FIG. 3, in an aspect, communication network 300 may include an NFC device 310 and a remote NFC device 350, both of which may be configured to communicate using NFC, and both of which may implement one or more aspects described herein for configuring a listening operation mode based on one or more listen mode profiles. In this example, remote NFC device 350 is acting as and may include one or more components of transmitter 104, and NFC device 310 is acting as and may include one or more components of receiver 108, as discussed above. NFC device 310 may include transceiver 340 and antenna 345, each of which may be configured to facilitate communication with remote NFC device 350 using NFC. For example, remote NFC device 350 may correspond to a remote device, card, or tag, connected wirelessly over the NFC radio interface to the NFC device 310. The transceiver 340 may further include a transmitter radio 342 for facilitating uplink data transmission and a receiver radio 344 for facilitating downlink data reception.

Additionally or alternatively, the NFC device 310 may include NFC module 343 comprising an NFC controller (FIG. 6) for utilizing information obtained from the device configuration component 335 in order to configure the NFC device 310. In some examples, the NFC module 343 may also include a device host (FIG. 6) that may be or otherwise take the form of an execution environment responsible for the overall management of the NFC device 310 and any peripherals. This may include the management (e.g., initialization, configuration, power management, etc.) of the NFC controller. Yet further, the NFC module 343 may include NFC controller interface (NCI) (FIG. 6) configured to facilitate communication at least between the device host and the NFC controller. For example, the NCI may be the logical interface between device host and NFC controller. The NFC device 310 may additionally include a bus 302 for coupling one or more components (e.g., mode selection component 315, device configuration component 335, NFC module 343, transceiver 340, antenna 345 and profile selection component 320) and for transferring data between each of the components and subcomponents inside the NFC device 310.

In some examples, the NFC device 310 may include mode selection component 315 configured to determine whether to enter a polling operation mode 316 or a listening operation mode 317. In some aspects, the mode selection component 315 may select one of a polling operation mode or a listening operation mode based on characteristics of at least one or more applications running on the NFC device 310. For example, but not limited hereto, if the one or more application is a mobile payment application for facilitating payments to vendors (e.g., coffee shops) via credit card information stored in the memory of the NFC device 310, the mode selection component 315 may select a listening operation mode for the NFC device 310. Alternatively, if the one or more application is a data sharing application where the user may select to share one or more data files (e.g., photos or contact information) on the NFC device 310 with a remote NFC device 350, the mode selection component 315 may select a polling operation mode to facilitate the sharing. In the illustrated example, the NFC device 310 may be configured to operate in a listening mode, while the remote NFC device 350 may be configured to operate in a polling mode. As such, a transceiver associated with the remote NFC device 350 may generate a radiated inductive field to facilitate data transfer in a near field communication. Alternatively, the transceiver 340 associated with the NFC 310 may include a receive antenna to receive signals and energy from the remote NFC device 350.

The NFC device 310 may additionally include a profile selection component 320. In some examples, the profile selection component 320 may identify a listen mode profile or a poll mode profile from a set of listen mode profiles 325 or a set of poll mode profiles 330, respectively, stored in the memory 608 (FIG. 6) of the NFC device 310. In an aspect, each of the set of listen mode profiles 325 or the set of poll mode profiles 330, respectively, may include one or more profiles. In some aspects, the profile selection component 320 may identify a listen mode profile from the set of listen mode profiles 325 based on determining one or more protocols supported by the NFC device 310.

Additionally or alternatively, each of the set of listen mode profiles 325 may include configuration parameter (e.g., P2P listen profile configuration parameter 346) and corresponding parameter values (e.g., P2P listen profile configuration parameter 347) for at least one listen state. The set of listen mode profiles 325 may include, but are not limited to, a peer-to-peer (P2P) listen mode profile 326, a Type 3 Tag (T3T) listen mode profile 327, a Type 4A Tag (T4AT) listen mode profile 328, or a Type 4B Tag (T4BT) listen mode profile 329. In some examples, a set of poll mode profiles 330 may include, but are not limited to, a peer-to-peer (P2P) poll mode profile 333, NFC Data Exchange Format (NDEF) poll mode profile 334, or a P2PNDEF poll mode profile 336. In an example, the P2P listen mode profile 326 may include a set of configuration parameters 346 and corresponding values 347 for a P2P listen state. The P2P listen mode profile 326 may be configured to establish communication with a remote NFC device 350 using NFC data exchange protocol (NFC-DEP).

In some aspects, the set of configuration parameters and corresponding parameter values for the P2P listen state may be defined based on the following Table 1, wherein each Parameter and corresponding Parameter Value are included in the following table:

TABLE 1

P2P Listen Mode Configuration Profile

| Parameter | P2P Parameter Value |
|---|---|
| CON_LISTEN_DEP_A | 1b |
| CON_LISTEN_DEP_F | 1b |
| CON_LISTEN_T3TP | 0b |
| CON_LISTEN_T4ATP | 0b |
| CON_LISTEN_T4BTP | 0b |
| CON_ADV_FEAT_F | 0b |
| CON_SYS_CODE[N] | N = 0, n.a. |
| CON_SENSF_RES[N] | N = 0, n.a. |
| CON_ATR_RES | As required |
| CON_ATS | n.a. |
| CON_SENSB_RES | n.a. |
| CON_ATTRIB_RES | n.a. |
| CON_BITR_F | 06h |

Further, for example, the T3T listen mode profile 327 may include a set of configuration parameters 348 and corresponding parameter values 349 for a T3T listen state. In some examples, the T3T listen mode profile 327 may be configured to establish communication with a remote NFC device 350 that implements Type 3 Tag operation. In some aspects, the set of configuration parameters and corresponding parameter values for the T3T listen state may be defined based on the following Table 2, wherein each Parameter and corresponding Parameter Value are included in the following table:

TABLE 2

T3T Listen Mode Configuration Profile

| Parameter | T3T Parameter Value |
|---|---|
| CON_LISTEN_DEP_A | 0b |
| CON_LISTEN_DEP_F | 0b |
| CON_LISTEN_T3TP | 1b |
| CON_LISTEN_T4ATP | 0b |
| CON_LISTEN_T4BTP | 0b |
| CON_ADV_FEAT_F | As defined by capability of device |
| CON_SYS_CODE[N] | N >= 1 |
| CON_SENSF_RES[N] | N >= 1 |
| CON_ATR_RES | n.a. |
| CON_ATS | n.a. |
| CON_SENSB_RES | n.a. |
| CON_ATTRIB_RES | n.a. |
| CON_BITR_F | As defined by capability of device |

In yet another example, the T4AT listen mode profile 328 may include a set of configuration parameters 350 and corresponding parameter values 351 for a T4AT listen state. In some examples, the T4AT listen mode profile 328 may be configured to establish communication with a remote NFC device 350 that implements Type 4 Tag operation using NFC type-A (NFC-A) radio frequency technology. The set of configuration parameters and corresponding parameter values for the T4AT listen state may be defined based on the following Table 3, wherein each Parameter and corresponding Parameter Value are included in the following table:

TABLE 3

T4AT Listen Mode Configuration Profile

| Parameter | T4AT Parameter Value |
|---|---|
| CON_LISTEN_DEP_A | 0b |
| CON_LISTEN_DEP_F | 0b |
| CON_LISTEN_T3TP | 0b |
| CON_LISTEN_T4ATP | 1b |
| CON_LISTEN_T4BTP | 0b |
| CON_ADV_FEAT_F | 0b |
| CON_SYS_CODE[N] | N = 0, n.a. |
| CON_SENSF_RES[N] | N = 0, n.a. |
| CON_ATR_RES | n.a. |
| CON_ATS | As required |
| CON_SENSB_RES | n.a. |
| CON_ATTRIB_RES | n.a. |
| CON_BITR_F | n.a. |

In a further example, the T4BT listen mode profile 329 may include a set of configuration parameters 352 and corresponding parameter values 353 for a T4BT listen state. The T4BT listen mode profile 329 may be configured to establish communication with a remote NFC device 350 that implements Type 4 Tag operation using NFC type-B (NFC-B) radio frequency technology. In some aspects, the set of configuration parameters and corresponding parameter values for the T4BT listen state may be defined based on the following Table 4, wherein each Parameter and corresponding Parameter Value are included in the following table:

TABLE 4

T4BT Listen Mode Configuration Profile

| Parameter | T4BT Parameter Value |
|---|---|
| CON_LISTEN_DEP_A | 0b |
| CON_LISTEN_DEP_F | 0b |
| CON_LISTEN_T3TP | 0b |
| CON_LISTEN_T4ATP | 0b |
| CON_LISTEN_T4BTP | 1b |
| CON_ADV_FEAT_F | 0b |
| CON_SYS_CODE[N] | N = 0, n.a. |
| CON_SENSF_RES[N] | N = 0, n.a. |
| CON_ATR_RES | n.a. |
| CON_ATS | n.a. |
| CON_SENSB_RES | As required |
| CON_ATTRIB_RES | As required |
| CON_BITR_F | n.a. |

Thus, a device configuration component 335 may configure the NFC device 310 based on at least one of the set of listen mode profiles 325 identified by the profile selection component 320. In some examples of the present disclosure, the selection and execution of the one of the set of listen mode profiles 325 may occur without user intervention during a communication process.

Figure 4:
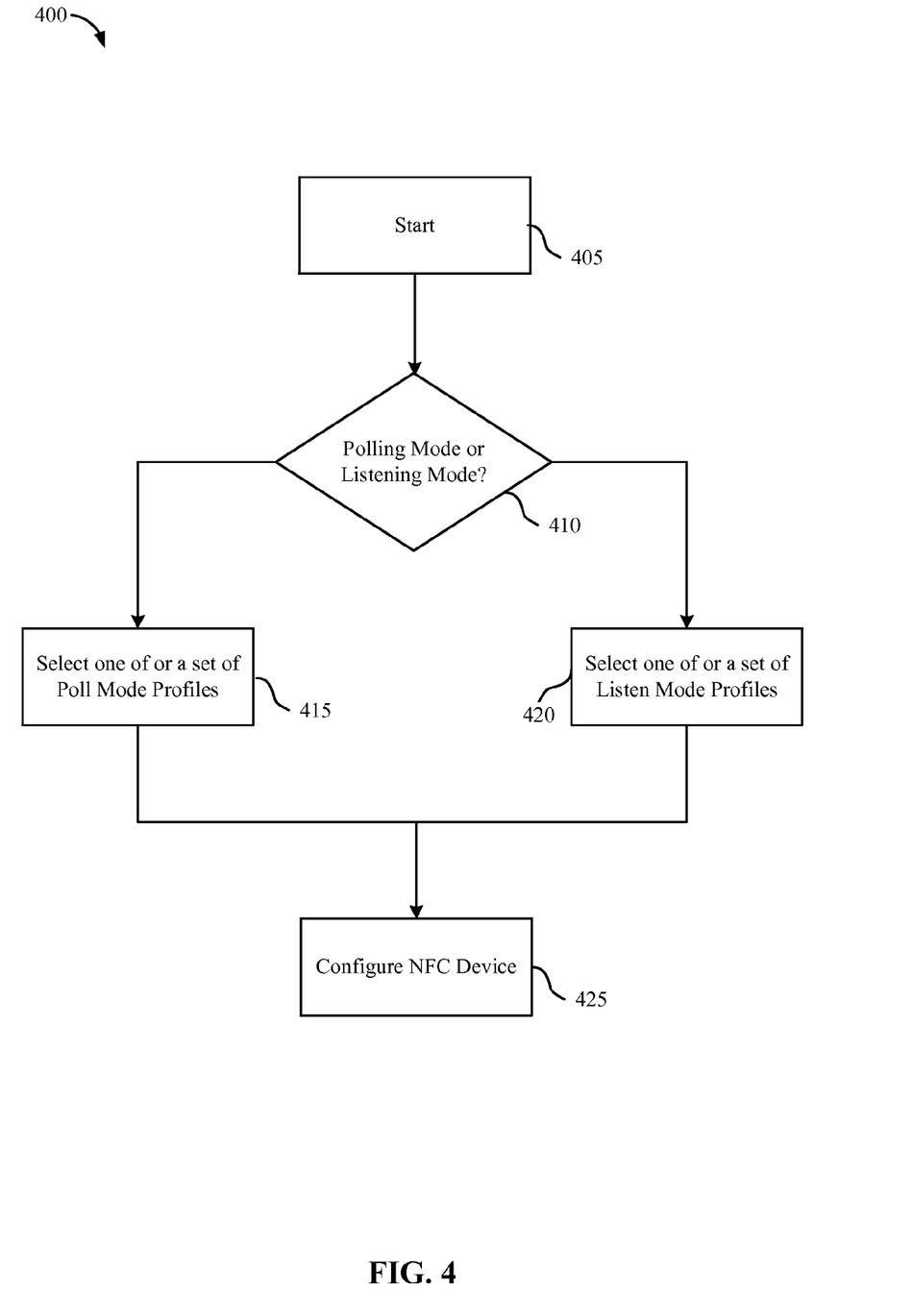
FIG. 4 is a flowchart describing an aspect of selecting an operational mode in accordance with an aspect of the present disclosure.

Referring to FIG. 4, a method 400 for determining whether to enter a polling operation mode or a listening operation mode is described, and may be implemented by an NFC device, such as the transmitter 104 and/or receiver 108 of FIGS. 1 and 2, or such as the NFC device 310 and/or remote NFC device 350 of FIG. 3. At block 405, the method 400 may start based on one or more applications associated with NFC being activated. For example, in the instance of mobile payment application that facilities payments to vendors (e.g., coffee shops) via credit card information stored in the memory of the NFC device, NFC configuration may be activated when the user launches the mobile payment application on the mobile device. In another example, NFC device configuration may be initiated when a NFC device-to-device data transfer application (e.g., photo sharing application) is launched by one or more mobile device. For instance, a user may initiate transmission of data on a mobile device by making physical contact with another device. The physical contact can be any type of physical touch that is referred to as a 'tap' or 'tapping.' Accordingly, when a "tap" is detected by an NFC device, the NFC device may initiate NFC configuration to facilitate data transfer between multiple mobile devices. In some examples, the NFC device may be in an idle mode or powered off prior to block 405.

At block 410, the method 400 may include the NFC device determining whether to enter a polling mode or listening mode. For example, in an aspect, the mode selection component 315 may determine whether to enter a polling mode or listening mode. In some aspects, the NFC device may determine whether to enter the polling operation mode or the listening operation mode by identifying a characteristic of at least one application on the NFC device. In some examples, the NFC device may select a listening operation mode based on the characteristic of at least one application. For example, as discussed above, if the one or more application is a mobile payment application for facilitating payments to vendors (e.g., coffee shops) via credit card information stored in the memory of the NFC device, the NFC device may select a listening operation mode for the NFC device. Alternatively, if the one or more application is a data sharing application where the user may select to share one or more data files on the NFC device (e.g., photos or contact information) with a remote NFC device, the NFC device may select a polling operation mode to facilitate the sharing.

If, at block 410, the method 400 determines to enter the polling operation mode, the NFC device, at block 415, may select one or a set of poll mode profiles 330, such as defined by the NFC Forum Specification. For example, in an aspect, the profile selection component 320 may select one or a set of poll mode profiles 330 for NFC device configuration. Alternatively, if, at block 410, the method determines to enter the listening operation mode, the NFC device, at block 420, may select one of or a set of listen mode profiles 325, as identified above. Aspects of block 420 may be performed by profile selection component 320 described with reference to FIG. 3.

At block 425, the NFC device may be configured based on the selected profile. For example, in an aspect, the device configuration component 335 may configure the NFC device based on the selected one or a set of poll mode profile(s) or a listen mode profile(s). For example, when the NFC device enters a listen mode profile, the NFC device may be configured based on configuration parameters and corresponding configuration values described above in Tables 1-4 for at least one listen state.

Figure 5:
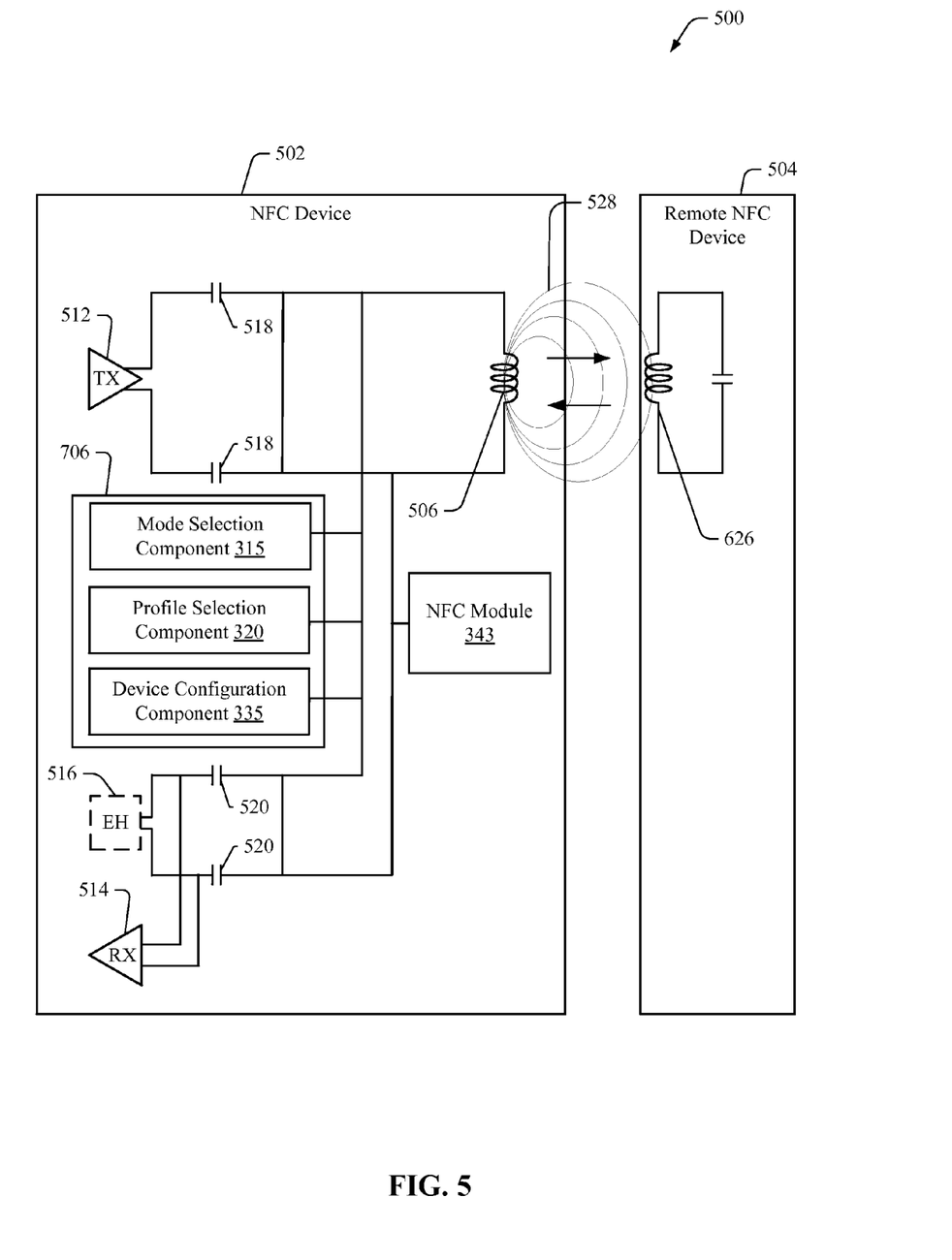
FIG. 5 is a block diagram of another NFC environment in accordance with an aspect of the present disclosure.

Referring to FIG. 5, a communication network 500 according to an aspect may include a NFC device 502 and a remote NFC device 504 that may be configured to communicate using NFC. It should be noted that NFC device 502 and a remote NFC device 504 may be the same as, or similar to, NFC device 310 and a remote NFC device 350 of FIG. 3 such that FIG. 5 includes additional components not shown in FIG. 3. NFC device 502 may include a NFC antenna coil 506 configured to facilitate NFC communications with remote NFC device 504, which may have a similar NFC coil 526. NFC device 502 may be the same as or similar to NFC device 310 (FIG. 3). For example, the NFC device 502 may include mode selection component 315 (FIG. 3), profile selection component 320 (FIG. 3), and device configuration component 335 (FIG. 3), and NFC module 343 (FIG. 3). Further, remote NFC device 504 may be the same as or similar to remote NFC device 350 (FIG. 3).

As part of NFC communications, NFC antenna coil 506 may generate an electromagnetic field in the area around the NFC antenna coil 506. The strength of the field may depend on the power source and the size and number of turns in NFC antenna coil 506. Further, impedance mismatches may cause a range of amplitude/phase changes dependant on size and inductance of NFC antenna coil 506 in the magnetic field 528. Capacitor 518 may be connected in parallel with the NFC antenna coil 606, where a transmitter component 512 and capacitors 518 may form an RLC oscillator establishing a resonant circuit with a frequency that corresponds to one or more transmission frequencies of the NFC device 502.

Because the wavelength of the frequency used is several times greater than the close proximity distance between the NFC antenna coil 506 and the antenna coil 526 of the remote NFC device 304, the electromagnetic field can be treated as an alternating magnetic field 528. This region of close proximity is referred to as the near field region. The NFC device 502 and remote NFC device 504 may be linked by their mutual inductance, as in an air core transformer, with the primary coil being the NFC antenna coil 306 and the secondary coil being the antenna coil 526 of the remote NFC device 504. The alternating magnetic field 528 penetrates the antenna coil 526 of the remote NFC device 304 when it is in the near field region, inducing an alternating current in the antenna coil 526 of the remote NFC device 504.

When operating in a listening mode, the NFC antenna coil 506, capacitors 520, optional energy harvester (EH) 516 and a receiver component 514 may form an RLC oscillator establishing a resonant circuit over which modulation of signal by remote NFC device 504 can be detected. When operating in a transmitting mode, NFC device 502 may apply a variable load resistance to the NFC antenna coil 506, thereby modulating magnetic field 528, to send a transmitted signal to transfer data to the remote NFC device 504.

Figure 6:
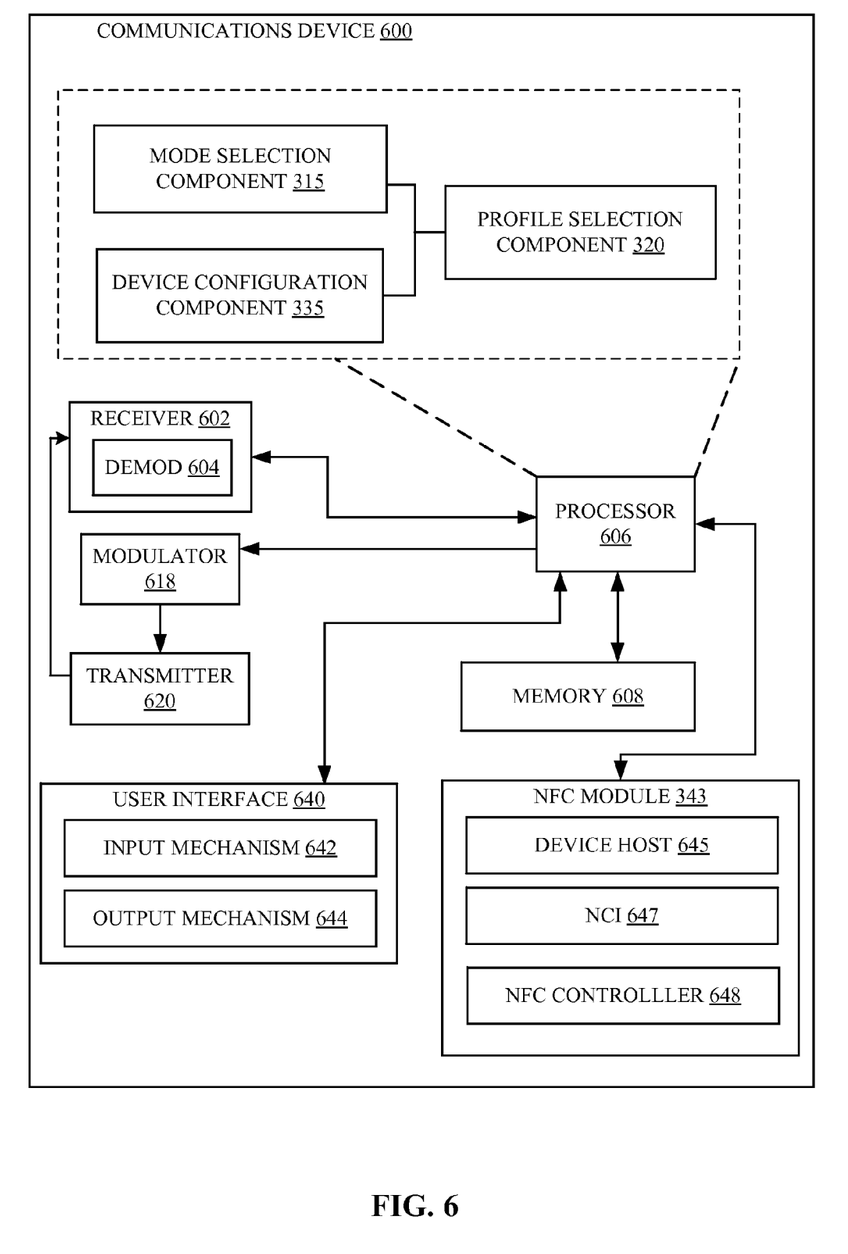
FIG. 6 is functional block diagram example architecture of a communications device in accordance with an aspect of the present disclosure.

Referring to FIG. 6 a communications device 600 may represent an example of NFC device 310, 502, remote NFC device 350, 504, etc., and may thus include components thereof and/or perform the associated functions described above. As depicted in FIG. 6, communications device 600 includes receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can include a demodulator 604 that can demodulate received symbols and provide them to processor 606 for channel estimation.

In some aspects, processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 617 which may modulate the signals processed by processor 606.

Communications device 600 can additionally include memory 608 that is operatively coupled to processor 606 and that can store data to be transmitted, received data, information related to available channels, TCP flows, data associated with analyzed signal and/or interference strength, information related to an assigned channel, power, rate, or the like, and any other suitable information for estimating a channel and communicating via the channel. In some examples, one or more listen mode profiles 325 or poll mode profiles 330 described above may be stored in the memory 708.

Further, transmitter 620 can generate a transmission signal for a transmitted carrier at a transmit circuit, and receiver 602 can receive a received carrier at a receive circuit. As described, transmitter 620 can be looped back to receiver 602 so the receiver 602 can receive the un-modulated carrier. Processor 606 can detect an over-coupling condition with another communications device based on comparing the received unmodulated carrier to the transmission signal generated by transmitter 620. As described, where the over-coupling condition occurs, this can be detected based on a threshold difference between a phase, amplitude, DC level, or other metric of the received carrier and transmission signal. When the over-coupling condition is detected, processor 606 can include or can implement Tx/Rx parameter component 652 for modifying a transmit or receive metric of transmitter 620 or receiver 602, as described, to mitigate the over-coupling condition.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory. For example, memory 608 can include instructions for performing the functions of the various components described herein.

The communications device 600 may additionally include mode selection component 315 for determining whether to enter a polling operation mode or a listening operation mode. Additionally or alternatively, the communications device 600 may include a profile selection component 320 for selecting at least one listen mode profile from a plurality of listen mode profiles stored in memory 608. In some examples, communications device 600 may include a device configuration component 335. The device configuration component 335 may configure the communications device 600 based on at least one listen mode profile selected by the profile selection component 320.

Additionally or alternatively, the communications device 600 may include NFC module 343 comprising an NFC controller 648 for utilizing information obtained from the device configuration component 335 in order to configure the NFC device 310. In some examples, the NFC module 343 may also include a device host 645 that may be or otherwise take the form of an execution environment responsible for the overall management of the NFC device 310 and any peripherals. This may include the management (e.g., initialization, configuration, power management, etc.) of the NFC controller. Yet further, the NFC module 343 may include NCI 647 configured to facilitate communication at least between the device host and the NFC controller. For example, the NCI may be the logical interface between device host and NFC controller.

In yet further examples, the communications device 600 may include user interface 640 comprising an input mechanisms 642 for generating inputs into communications device 600, and output mechanism 644 for generating information for consumption by the user of the communications device 600. For example, input mechanism 642 may include a mechanism such as a key or keyboard, a mouse, a touchscreen display, a microphone, etc. Further, for example, output mechanism 644 may include a display, an audio speaker, a haptic feedback mechanism, etc. In the illustrated aspects, the output mechanism 644 may include a display configured to present media content that is in image or video format or an audio speaker to present media content that is in an audio format.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein with respect to NFC communications may be used by a device configured for additional communication using various other wireless communication systems, such as but not limited to CDMA, TDMA, FDMA, OFDMA, SC-FDMA, LTE, and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Aspects of the above disclosure are depicted with reference to one or more components and one or more methods that may perform the actions or functions described herein. In an aspect, the term "component" as used above may be one of the parts that make up a system, may be hardware or software or some combination thereof, and may be divided into other components. Although the operations described were presented in a particular order and/or as being performed by an example component, it should be understood that the ordering of the actions and the components performing the actions may be varied, depending on the implementation. Moreover, it should be understood that the actions or functions, as described, may be performed by a specially-programmed processor, a processor executing specially-programmed software or computer-readable media, or by any other combination of a hardware component and/or a software component capable of performing the described actions or functions.

The various illustrative logics, logical blocks, modules, and circuits described in connection with the aspects disclosed above may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a non-transitory machine readable medium and/or computer readable medium, which may be incorporated into a computer program product.

In one or more aspects, the functions described may be implemented in hardware, software, firmware, or any combination thereof. If implemented in software, the functions may be stored as one or more instructions or code on a non-transitory computer-readable medium. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

The invention claimed is:

1. A method for near field communication (NFC), comprising:
   determining whether to enter a listening operation mode;
   identifying a listen mode profile from a plurality of listen mode profiles based on determining to enter the listening operation mode; and
   configuring a first NFC device based on the listen mode profile,
   wherein determining whether to enter a listening operation mode comprises:
   identifying characteristics of at least one application on the first NFC device; and
   selecting the listening operation mode based on the characteristics of the at least one application.

2. The method of claim 1, wherein identifying the listen mode profile from the plurality of listen mode profiles comprises:
   determining one or more protocols supported by the first NFC device; and
   selecting the listen mode profile associated with the one or more protocols supported by the first NFC device.

3. The method of claim 1, wherein the plurality of listen mode profiles include configuration parameter values for at least one listen state.

4. The method of claim 3, wherein the plurality of listen mode profiles comprises two or more of a peer-to-peer (P2P) listen mode profile, a Type 3 Tag (T3T) listen mode profile, a Type 4A Tag (T4AT) listen mode profile, or a Type 4B Tag (T4BT) listen mode profile.

5. The method of claim 1, wherein the plurality of listen mode profiles include a peer-to-peer (P2P) listen mode profile having a set of configuration parameters and corresponding parameter values for a P2P listen state, wherein the P2P listen mode profile is configured to establish communication with a second NFC device using NFC data exchange protocol (NFC-DEP).

6. The method of claim 5, wherein the set of configuration parameters and corresponding parameter values for the P2P listen state are included in the following table:

| Parameter | P2P Parameter Value |
| --- | --- |
| CON_LISTEN_DEP_A | 1b |
| CON_LISTEN_DEP_F | 1b |
| CON_LISTEN_T3TP | 0b |
| CON_LISTEN_T4ATP | 0b |
| CON_LISTEN_T4BTP | 0b |
| CON_ADV_FEAT_F | 0b |
| CON_SYS_CODE[N] | N = 0, n.a. |
| CON_SENSF_RES[N] | N = 0, n.a. |
| CON_ATR_RES | As required |
| CON_ATS | n.a. |
| CON_SENSB_RES | n.a. |
| CON_ATTRIB_RES | n.a. |
| CON_BITR_F | 06h. |

7. The method of claim 1, wherein the plurality of listen mode profiles include a Type 3 Tag (T3T) listen mode profile having a set of configuration parameters and corresponding parameter values for a T3T listen state, wherein the T3T listen mode profile is configured to establish communication with a second NFC device that implements Type 3 Tag operation.

8. The method of claim 7, wherein the set of configuration parameters and corresponding parameter values for the T3T listen state are included in the following table:

| Parameter | T3T Parameter Value |
| --- | --- |
| CON_LISTEN_DEP_A | 0b |
| CON_LISTEN_DEP_F | 0b |
| CON_LISTEN_T3TP | 1b |
| CON_LISTEN_T4ATP | 0b |
| CON_LISTEN_T4BTP | 0b |
| CON_ADV_FEAT_F | As defined by capability of device |
| CON_SYS_CODE[N] | N >= 1 |
| CON_SENSF_RES[N] | N >= 1 |
| CON_ATR_RES | n.a. |

-continued

| Parameter | T3T Parameter Value |
|---|---|
| CON_ATS | n.a. |
| CON_SENSB_RES | n.a. |
| CON_ATTRIB_RES | n.a. |
| CON_BITR_F | As defined by capability of device. |

9. The method of claim 1, wherein the plurality of listen mode profiles include a Type 4A Tag (T4AT) listen mode profile having a set of configuration parameters and corresponding parameter values for a T4AT listen state, wherein the T4AT listen mode profile is configured to establish communication with a second NFC device that implements Type 4 Tag operation using NFC type-A (NFC-A) radio frequency technology.

10. The method of claim 9, wherein the set of configuration parameters and corresponding parameter values for the T4AT listen state are included in the following table:

| Parameter | T4AT Parameter Value |
|---|---|
| CON_LISTEN_DEP_A | 0b |
| CON_LISTEN_DEP_F | 0b |
| CON_LISTEN_T3TP | 0b |
| CON_LISTEN_T4ATP | 1b |
| CON_LISTEN_T4BTP | 0b |
| CON_ADV_FEAT_F | 0b |
| CON_SYS_CODE[N] | N = 0, n.a. |
| CON_SENSF_RES[N] | N = 0, n.a. |
| CON_ATR_RES | n.a. |
| CON_ATS | As required |
| CON_SENSB_RES | n.a. |
| CON_ATTRIB_RES | n.a. |
| CON_BITR_F | n.a.. |

11. The method of claim 1, wherein the plurality of listen mode profiles include a Type 4B Tag (T4BT) listen mode profile having a set of configuration parameters and corresponding parameter values for a T4BT listen state, wherein the T4BT listen mode profile is configured to establish communication with a second NFC device that implements Type 4 Tag operation using NFC type-B (NFC-B) radio frequency technology.

12. The method of claim 11, wherein the set of configuration parameters and corresponding parameter values for the T4BT listen state are included in the following table:

| Parameter | T4BT Parameter Value |
|---|---|
| CON_LISTEN_DEP_A | 0b |
| CON_LISTEN_DEP_F | 0b |
| CON_LISTEN_T3TP | 0b |
| CON_LISTEN_T4ATP | 0b |
| CON_LISTEN_T4BTP | 1b |
| CON_ADV_FEAT_F | 0b |
| CON_SYS_CODE[N] | N = 0, n.a. |
| CON_SENSF_RES[N] | N = 0, n.a. |
| CON_ATR_RES | n.a. |
| CON_ATS | n.a. |
| CON_SENSB_RES | As required |
| CON_ATTRIB_RES | As required |
| CON_BITR_F | n.a.. |

13. The method of claim 1, wherein the listen mode profile is run without user intervention during a communication process.

14. An apparatus for near field communication (NFC) device, comprising:
means for determining to enter a listening operation mode;
means for identifying a listen mode profile from the plurality of listen mode profiles based on determining to enter the listening operation mode; and
means for configuring the NFC device based on the listen mode profile,
wherein means for determining to enter a listening operation mode comprises:
means for identifying characteristics of at least one application on the NFC device; and
means for selecting the listening operation mode based on the characteristics of the at least one application.

15. The apparatus of claim 14, wherein the means for identifying the listen mode profile from the plurality of listen mode profiles comprises:
means for determining one or more protocols supported by the first NFC device; and
means for selecting the listen mode profile associated with the one or more protocols supported by the first NFC device.

16. The apparatus of claim 14, wherein the plurality of listen mode profiles include configuration parameter values for at least one listen state.

17. The apparatus of claim 16, wherein the plurality of listen mode profiles comprises two or more of a peer-to-peer (P2P) listen mode profile, a Type 3 Tag (T3T) listen mode profile, a Type 4A Tag (T4AT) listen mode profile, or a Type 4B Tag (T4BT) listen mode profile.

18. The apparatus of claim 14, wherein the plurality of listen mode profiles include a peer-to-peer (P2P) listen mode profile having a set of configuration parameters and corresponding parameter values for a P2P listen state, wherein the P2P listen mode profile is configured to establish communication with a second NFC device using NFC data exchange protocol (NFC-DEP).

19. The apparatus of claim 18, wherein the set of configuration parameters and corresponding parameter values for the P2P listen state are included in the following table:

| Parameter | P2P Parameter Value |
|---|---|
| CON_LISTEN_DEP_A | 1b |
| CON_LISTEN_DEP_F | 1b |
| CON_LISTEN_T3TP | 0b |
| CON_LISTEN_T4ATP | 0b |
| CON_LISTEN_T4BTP | 0b |
| CON_ADV_FEAT_F | 0b |
| CON_SYS_CODE[N] | N = 0, n.a. |
| CON_SENSF_RES[N] | N = 0, n.a. |
| CON_ATR_RES | As required |
| CON_ATS | n.a. |
| CON_SENSB_RES | n.a. |
| CON_ATTRIB_RES | n.a. |
| CON_BITR_F | 06h. |

20. The apparatus of claim 14, wherein the plurality of listen mode profiles include a Type 3 Tag (T3T) listen mode profile having a set of configuration parameters and corresponding parameter values for a T3T listen state, wherein the T3T listen mode profile is configured to establish communication with a second NFC device that implements Type 3 Tag operation.

21. The apparatus of claim 20, wherein the set of configuration parameters and corresponding parameter values for the T3T listen state are included in the following table:

| Parameter | T3T Parameter Value |
|---|---|
| CON_LISTEN_DEP_A | 0b |
| CON_LISTEN_DEP_F | 0b |
| CON_LISTEN_T3TP | 1b |
| CON_LISTEN_T4ATP | 0b |
| CON_LISTEN_T4BTP | 0b |
| CON_ADV_FEAT_F | As defined by capability of device |
| CON_SYS_CODE[N] | N >= 1 |
| CON_SENSF_RES[N] | N >= 1 |
| CON_ATR_RES | n.a. |
| CON_ATS | n.a. |
| CON_SENSB_RES | n.a. |
| CON_ATTRIB_RES | n.a. |
| CON_BITR_F | As defined by capability of device. |

22. The apparatus of claim 14, wherein the plurality of listen mode profiles include a Type 4A Tag (T4AT) listen mode profile having a set of configuration parameters and corresponding parameter values for a T4AT listen state, wherein the T4AT listen mode profile is configured to establish communication with a second NFC device that implements Type 4 Tag operation using NFC type-A (NFC-A) radio frequency technology.

23. The apparatus of claim 22, wherein the set of configuration parameters and corresponding parameter values for the T4AT listen state are included in the following table:

| Parameter | T4AT Parameter Value |
|---|---|
| CON_LISTEN_DEP_A | 0b |
| CON_LISTEN_DEP_F | 0b |
| CON_LISTEN_T3TP | 0b |
| CON_LISTEN_T4ATP | 1b |
| CON_LISTEN_T4BTP | 0b |
| CON_ADV_FEAT_F | 0b |
| CON_SYS_CODE[N] | N = 0, n.a. |
| CON_SENSF_RES[N] | N = 0, n.a. |
| CON_ATR_RES | n.a. |
| CON_ATS | As required |
| CON_SENSB_RES | n.a. |
| CON_ATTRIB_RES | n.a. |
| CON_BITR_F | n.a.. |

24. The apparatus of claim 14, wherein the plurality of listen mode profiles include a Type 4B Tag (T4BT) listen mode profile having a set of configuration parameters and corresponding parameter values for a T4BT listen state, wherein the T4BT listen mode profile is configured to establish communication with a second NFC device that implements Type 4 Tag operation using NFC type-B (NFC-B) radio frequency technology.

25. The apparatus of claim 24, wherein the set of configuration parameters and corresponding parameter values for the T4BT listen state are included in the following table:

| Parameter | T4BT Parameter Value |
|---|---|
| CON_LISTEN_DEP_A | 0b |
| CON_LISTEN_DEP_F | 0b |
| CON_LISTEN_T3TP | 0b |
| CON_LISTEN_T4ATP | 0b |
| CON_LISTEN_T4BTP | 1b |
| CON_ADV_FEAT_F | 0b |
| CON_SYS_CODE[N] | N = 0, n.a. |
| CON_SENSF_RES[N] | N = 0, n.a. |
| CON_ATR_RES | n.a. |
| CON_ATS | n.a. |
| CON_SENSB_RES | As required |
| CON_ATTRIB_RES | As required |
| CON_BITR_F | n.a.. |

26. The apparatus of claim 14, wherein the listen mode profile is run without user intervention during a communication process.

27. A non-transitory computer-readable medium storing computer executable code for near field communication (NFC), the code comprising instructions executable to:
   code for determining to enter a listening operation mode;
   code for identifying a listen mode profile from the plurality of listen mode profiles based on determining to enter the listening operation mode; and
   code for configuring the NFC device based on the listen mode profile,
   wherein code for determining to enter a listening operation mode comprises:
      code for identifying characteristics of at least one application on the NFC device; and
      code for selecting the listening operation mode based on the characteristics of the at least one application.

28. The non-transitory computer-readable medium of claim 27, wherein the code for identifying the listen mode profile from the plurality of listen mode profiles comprises:
   code for determining one or more protocols supported by the NFC device; and
   code for selecting the listen mode profile associated with the one or more protocols supported by the NFC device.

29. The non-transitory computer-readable medium of claim 27, wherein the plurality of listen mode profiles include configuration parameter values for at least one listen state.

30. The non-transitory computer-readable medium of claim 29, wherein the plurality of listen mode profiles comprises two or more of a peer-to-peer (P2P) listen mode profile, a Type 3 Tag (T3T) listen mode profile, a Type 4A Tag (T4AT) listen mode profile, or a Type 4B Tag (T4BT) listen mode profile.

31. A near field communication (NFC) device, comprising:
   a transceiver comprising a transmit antenna for generating a radiated inductive field to facilitate data transfer, and a receive antenna for receiving signals and energy;
   a memory configured to store a plurality of listen mode profiles; and
   at least one processor communicatively coupled to the memory and the transceiver via a bus, the at least one processor configured to:
      determine to enter a listening operation mode;
      identify a listen mode profile from the plurality of listen mode profiles based on determining to enter the listening operation mode; and
      configure the NFC device based on the listen mode profile,
      wherein determine to enter a listening operation mode comprises:
         identify characteristics of at least one application on the NFC device; and select the listening operation mode based on the characteristics of the at least one application.

32. The apparatus of claim 31, wherein the processor is further configured to:
 determine one or more protocols supported by the NFC device; and
 select the listen mode profile associated with the one or more protocols supported by the NFC device.

33. The apparatus of claim 31, wherein the NFC device includes an NFC module, and wherein the processor configures the NFC module based on the listen mode profile.

34. The apparatus of claim 31, wherein the plurality of listen mode profiles comprises two or more of a peer-to-peer (P2P) listen mode profile, a Type 3 Tag (T3T) listen mode profile, a Type 4A Tag (T4AT) listen mode profile, or a Type 4B Tag (T4BT) listen mode profile.

35. The apparatus of claim 31, wherein the plurality of listen mode profiles include a peer-to-peer (P2P) listen mode profile having a set of configuration parameters and corresponding parameter values for a P2P listen state, wherein the P2P listen mode profile is configured to establish communication with a second NFC device using NFC data exchange protocol (NFC-DEP).

36. The apparatus of claim 31, wherein the plurality of listen mode profiles include a Type 3 Tag (T3T) listen mode profile having a set of configuration parameters and corresponding parameter values for a T3T listen state, wherein the T3T listen mode profile is configured to establish communication with a second NFC device that implements Type 3 Tag operation.

37. The apparatus of claim 31, wherein the plurality of listen mode profiles include a Type 4A Tag (T4AT) listen mode profile having a set of configuration parameters and corresponding parameter values for a T4AT listen state, wherein the T4AT listen mode profile is configured to establish communication with a second NFC device that implements Type 4 Tag operation using NFC type-A (NFC-A) radio frequency technology.

38. The apparatus of claim 31, wherein the plurality of listen mode profiles include a Type 4B Tag (T4BT) listen mode profile having a set of configuration parameters and corresponding parameter values for a T4BT listen state, wherein the T4BT listen mode profile is configured to establish communication with a second NFC device that implements Type 4 Tag operation using NFC type-B (NFC-B) radio frequency technology.

\* \* \* \* \*